I. W. STEWART.

Safety-Pin.

No. 8,592. Reissued Feb. 18, 1879.

Witnesses:

Clarence Poole

L. M. Sears

Inventor:

Isaac W. Stewart, by Ellis Spear

His Attys.

N. PETERS, PHOTO-LITHOGRAPHER, WASHINGTON, D. C.

UNITED STATES PATENT OFFICE.

ISAAC W. STEWART, OF NEW YORK, N. Y.

IMPROVEMENT IN SAFETY-PINS.

Specification forming part of Letters Patent No. 106,422, dated August 16, 1870; Reissue No. 6,698, dated October 11, 1875; Reissue No. 8,592, dated February 18, 1879; application filed January 13, 1879.

*To all whom it may concern:*

Be it known that I, ISAAC W. STEWART, of the city, county, and State of New York, have invented a new and Improved Diaper-Pin; and that the following is a full, clear, and exact description of the same, reference being had to the accompanying drawings, and to the letters of reference marked thereon, making a part of this specification.

My invention relates to diaper or safety pins, having for its object reduction in the cost of manufacture and improvement in the form of the pin when made.

It consists, first, in an improved construction of shield, the same being made out of sheet metal, the edges of which are turned to clamp the unpointed end on one side, and to cover the point of the pin on the opposite side.

It consists, further, in fixing the shield to the unpointed end by swaging or pressing the metal of the shield forcibly upon the end of the pin, so as to hold the parts together without the aid of solder.

It consists, further, in details of construction, which will be fully described, and particularly pointed out in the claims.

Figure 1:
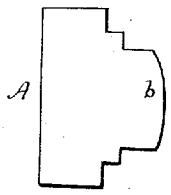
Figure 2:
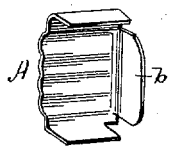
Figure 3:
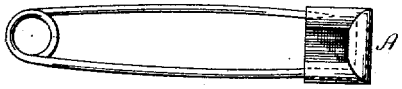
Figure 4:
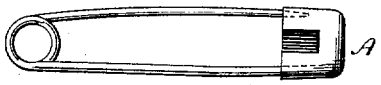
Figure 5:
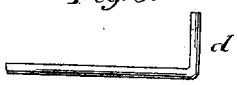

In the accompanying sheet of drawings, Figure 1 is a plan of the blank which I use to make the shield. Fig. 2 is the same when partially bent or shaped, and ready for application to the wire. Fig. 3 is a plan of the shield when finished and attached to the wire. Fig. 4 is a plan of the diaper-pin as usually made before my invention; and Fig. 5 is a side view, showing angular bend at end of pin.

Similar letters of reference indicate like parts in the several figures.

Diaper or safety pins, as heretofore constructed, have had the shields A for the point of the pin made by first striking up disks of metal in the shape of cups, then flattening them, and making a slot in the flattened side, and finally soldering them to the unsharpened end of the wire, as shown in Fig. 4. This operation is not only slow, but expensive, and it is particularly objectionable, since the wire is attached to the side of the shield by solder, which not only makes an unsightly joint, but a weak connection.

The pins are made of suitable wire and in the form shown in Fig. 4. The shield is made of a blank of sheet metal, the edges of which I strike up, in any suitable manner known in the art of metal-working, so that the upturned edges may be bent over the end of the pin when inserted therein. When the edges of the said blank have been thus turned upward, the unpointed end of the pin is inserted on one side, and the edges forced down into close contact with the end of the pin, to form a firm joint or connection between the two parts. The other portions of the edge of the blank, not in contact with the side of the pin, also pressed down, afford a guard for the sharpened end of the pin.

The blank is cut of such size and shape that when the edges are bent over there shall be a space left midway between the two sides for the admission of the pointed end of the pin when the article is in use. Manifestly the part of the edge bent over to protect the point must be bent so as to leave space for the admission of the pin, and allow it to rest at the bottom of the curved inlet on one side.

The unpointed end of the pin is shown at *d* in Fig. 5 as bent at right angles, to extend across the bottom or end of the shield, which plainly affords additional security of connection between the parts.

The shield is also shown as corrugated. This, when thin metal is used, strengthens the shield.

The part *b* (shown in Fig. 1) is struck up, as shown in Fig. 2, and when pressed down closes the end of the shield.

Having thus described the construction of my invention, what I claim as new, and desire to secure by Letters Patent, is—

1. A shield for safety-pins, formed out of sheet-metal blanks, with the edges bent to inclose and clamp the ends of the pin, as set forth.

2. A safety-pin consisting of the wire B and a shield formed of sheet metal, the edges of which are bent over the ends of the wire, and held to the unpointed end by the pressure of the sheet metal upon the wire, as set forth.

3. A shield for safety-pins, the edges of which are bent to cover the ends of the wire, and to hold the unpointed end, the ends *a a* being so constructed and arranged as to leave an open slot between the sides for the admission of the pointed end, as set forth.

4. In a safety-pin composed of the wire B and a shield of the form described, the extension *d* of the said wire, as set forth.

5. In a safety-pin, the shield thereof, being constructed with a series of corrugations, substantially as and for the purpose described.

I. W. STEWART.

Witnesses:
E. W. TUTHILL,
H. MANN.